US010737694B2

(12) United States Patent
Jones et al.

(10) Patent No.: US 10,737,694 B2
(45) Date of Patent: *Aug. 11, 2020

(54) VARIABLY CONTROLLED GROUND VEHICLE

(71) Applicant: THE BOEING COMPANY, Chicago, IL (US)

(72) Inventors: Richard Donovan Jones, Bellevue, WA (US); David A. Whelan, Newport Coast, CA (US); Lynne Wenberg, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,536

(22) Filed: Sep. 18, 2018

(65) Prior Publication Data
US 2019/0152475 A1 May 23, 2019

Related U.S. Application Data

(63) Continuation of application No. 14/292,342, filed on May 30, 2014, now Pat. No. 10,124,800.

(51) Int. Cl.
*B60W 30/12* (2020.01)
*B62D 15/02* (2006.01)
(Continued)

(52) U.S. Cl.
CPC ............ *B60W 30/12* (2013.01); *B60W 30/09* (2013.01); *B60W 30/143* (2013.01);
(Continued)

(58) Field of Classification Search
CPC ....... B60W 30/12; G05D 3/12; G05D 1/0223; G05D 1/0214; G05D 1/0088
(Continued)

(56) References Cited

U.S. PATENT DOCUMENTS 6,768,944 B2  7/2004  Breed et al.
7,979,172 B2  7/2011  Breed
(Continued)

FOREIGN PATENT DOCUMENTS

JP  2005250564 A  9/2005

OTHER PUBLICATIONS

European Search Report for 151653490.0, dated Dec. 22, 2015.

*Primary Examiner* — Maceeh Anwari
(74) *Attorney, Agent, or Firm* — Patterson + Sheridan, LLP

(57) ABSTRACT

Method and apparatus for providing autonomous control of a vehicle. A vehicle can be manually controlled by an operator. An autonomous system can monitor the operator's control inputs and the environment of the vehicle to determine whether the control inputs result in safe operation of the vehicle. If control inputs are not safe, then the autonomous system can modify the operator's unsafe inputs into safe inputs. In various instances, the autonomous system can operate the vehicle without operator input. In the event an operator attempts to apply control inputs to the vehicle while the autonomous system is otherwise in control, the autonomous system can check to see whether the operator's inputs result in safe operation of the vehicle. If the operator's control inputs are safe, then the autonomous system can replace its autonomous commands with the operator's commands.

20 Claims, 4 Drawing Sheets

(51) Int. Cl.
*G05D 1/00* (2006.01)
*B60W 50/08* (2020.01)
*B60W 50/10* (2012.01)
*B60W 50/14* (2020.01)
*B60W 30/14* (2006.01)
*B60W 50/16* (2020.01)
*B60W 30/09* (2012.01)

(52) U.S. Cl.
CPC .......... *B60W 50/087* (2013.01); *B60W 50/10* (2013.01); *B60W 50/14* (2013.01); *B60W 50/16* (2013.01); *B62D 15/025* (2013.01); *B62D 15/0265* (2013.01); *G05D 1/0061* (2013.01); *B60W 2540/043* (2020.02); *B60W 2540/12* (2013.01); *B60W 2540/14* (2013.01); *B60W 2540/18* (2013.01); *B60W 2540/30* (2013.01); *G05D 2201/0213* (2013.01)

(58) Field of Classification Search
USPC .......................................................... 701/23
See application file for complete search history.

(56) References Cited

U.S. PATENT DOCUMENTS

| | | | |
|---|---|---|---|
| 7,979,173 | B2 | 7/2011 | Breed |
| 2009/0018723 | A1* | 1/2009 | Chevion ............... B60W 50/16 701/36 |
| 2010/0228420 | A1 | 9/2010 | Lee |
| 2010/0228427 | A1* | 9/2010 | Anderson ............. B60W 30/09 701/31.4 |
| 2011/0193693 | A1 | 8/2011 | Filev et al. |
| 2012/0109610 | A1 | 5/2012 | Anderson et al. |
| 2013/0030606 | A1 | 1/2013 | Mudalige et al. |
| 2013/0041576 | A1 | 2/2013 | Switkes et al. |
| 2014/0088814 | A1 | 3/2014 | You et al. |
| 2015/0346724 | A1 | 12/2015 | Jones et al. |

\* cited by examiner

VARIABLY CONTROLLED GROUND VEHICLE

CROSS-REFERENCE TO RELATED APPLICATION

This application is a continuation of co-pending U.S. application Ser. No. 14/292,342, filed May 30, 2014 and entitled "VARIABLY CONTROLLED GROUND VEHICLE", which has since issued as U.S. Pat. No. 10,124,800. The aforementioned patent application is herein incorporated by reference in its entirety.

BACKGROUND

The present disclosure relates to vehicle control, and more specifically, to autonomous vehicle control in the absence of safe operating commands from an operator.

SUMMARY

Embodiments presented herein can provide for seamless integration between automated control of a vehicle and operator control of the vehicle. In various instances, and operator can control the vehicle through one or more "drive by wire" controls. An automated system can monitor the operator's inputs to the system via control inceptors and determine whether the inputs are within a safe range of inputs based on vehicle dynamics, the vehicle environment, etc. In instances where the operators inputs are not safe. The system can modify the control inputs such that they follow safe range. In various other instances, the automated system can be controlling operation of the vehicle (e.g., following a predefined path or route). The automated system can apply automated commands to various vehicle controls to modify the vehicles direction of travel and/or speed of travel. Upon receiving a control input from an operator via the control inceptors, the automated system can determine whether the operators input results in a safe command to the various vehicle controls. If the operators inputs results in a safe command, then the automated system can replace the automated commands with the user—input commands. However, if the operator's inputs result in an unsafe, the automated system can prohibit modification of the automated commands.

According to one embodiment, a method for controlling a vehicle can include generating at least one autonomous operation of command for directing a vehicle along a predefined path. The method can monitor operation of at least one control input for the vehicle, wherein an operator can provide control commands for the vehicle through the at least one control input. Operation of the control inputs can results in a modified command different from the at least one autonomous command. Upon determining that a control input is within a determined safe range of operation, the method replaces the autonomous command with the modified command. Upon determining that a control input is not within a determined safe range of operation, the method prevents modification of the autonomous command.

According to one embodiment, a vehicle can include a control input, a sensor configured to detect an aspect of an environment of the vehicle, and a vehicle control. The vehicle control can be configured to modify at least one of a travel speed and direction of travel of the vehicle in response to an input to the control input. The vehicle can also include a controller configured to determine a safe range of operation of the control input that corresponds to a safe range of operation of the vehicle control. The determined safe range of operation of the control input can be based on the detected aspect of the environment from the sensor. The controller can monitor operation of the control input by an operator of the vehicle. Upon determining that the vehicle operator has operated the control input outside of the determined safe range, the controller can automatically modify operation of the vehicle control to an operation that is within the determined safe range.

According to one embodiment, a controller can include an input configured to receive a plurality of control input signals from vehicle inceptors and an output configured to transmit a plurality of command signals to a plurality of vehicle controls. The controller can include computer logic configured to transform the plurality of control input signals into a plurality of command signals. Upon determining that the plurality of control inputs signals result in an unsafe command to the vehicle controls, the computer logic can modify the plurality of command signals to be safe command signals.

BRIEF DESCRIPTION OF ILLUSTRATIONS

DETAILED DESCRIPTION

Figure 1:
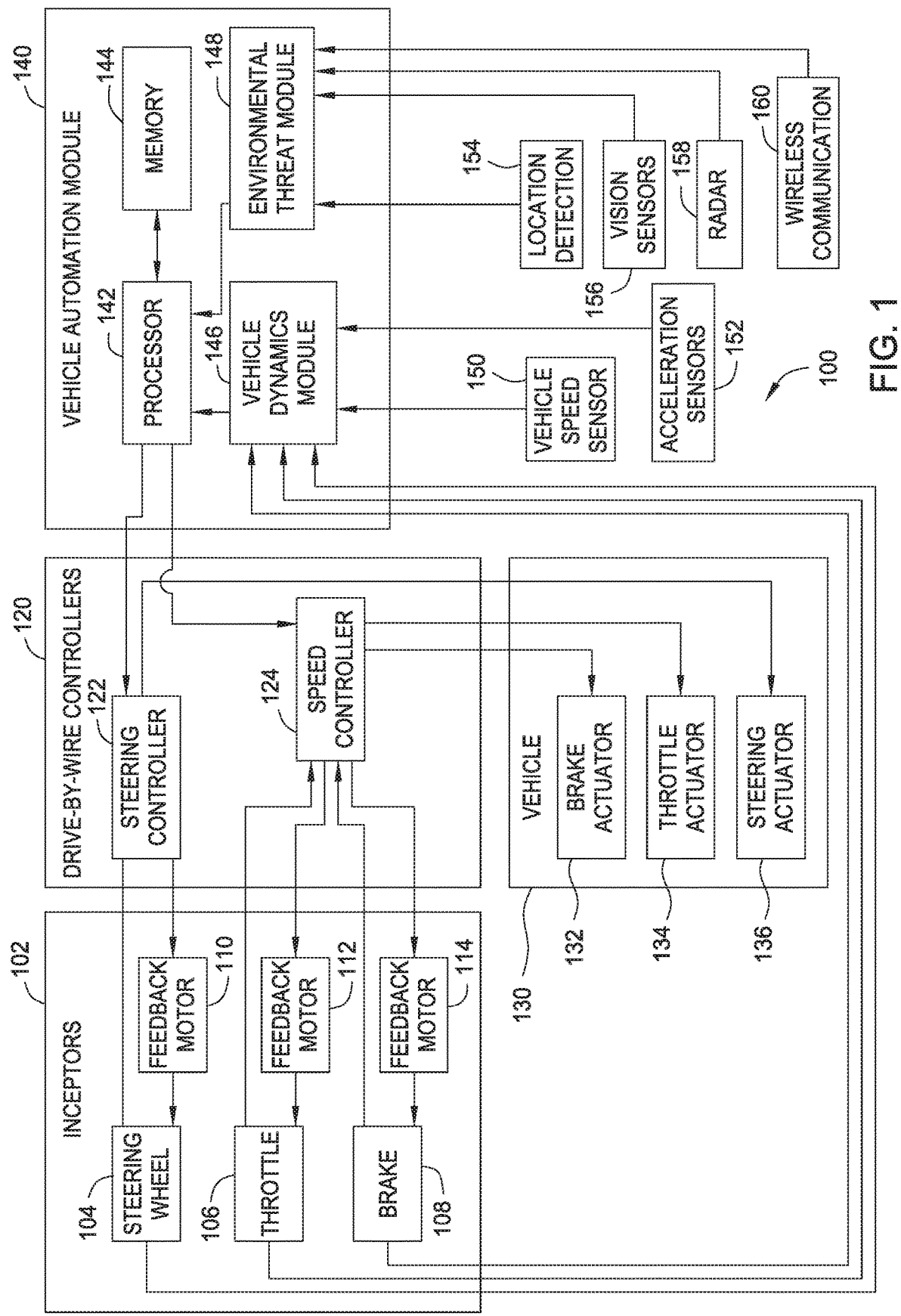
FIG. 1 is a block diagram of a vehicle, including vehicle controls, vehicle control inputs, and an automation module according to an embodiment.

With reference now to FIG. 1, embodiments of a vehicle 100 can include various control inputs 102 (i.e., inceptors) that an operator can use to affect travel of the vehicle 100. For example, a car can include a steering wheel 104, a throttle pedal 106, and a brake pedal 108. In the various embodiments described herein, the control inputs can be "drive by wire," meaning the control inputs are not mechanically connected to the controls. Rather, the control inputs 102 communicate signals that are read by controllers, and the controllers send signals that cause operation of the controls. Referring to FIG. 1, the steering wheel 104 can be in data communication with a steering controller 122. The steering controller 122 can translate movement of the steering wheel 104 into steering commands and transmits the steering commands to a steering actuator 136 (e.g. a motor that drives a rack and pinion steering arrangement). Similarly, the throttle pedal 106 and/or brake pedal 108 can be connected to a speed controller 124. The speed controller 124 can translate positions of the throttle pedal 106 and brake pedal 108 into vehicle speed commands and can transmit the vehicle speed commands to a throttle actuator 134 (e.g., a linear actuator driven throttle body) and a brake actuator 132 (e.g., an actuator driven brake master cylinder), respectively.

In various embodiments, the control inputs 102 can include feedback motors 110, 112, and 114 that provide feedback to the operator through the control inceptors. For example, the steering wheel 104 can be connected to a feedback motor 110 that is capable of turning the steering wheel 104 and/or that is capable of resisting turning of the steering wheel 104. The steering controller 122 can send control signals to the feedback motor 110 as the vehicle drives along. For example, the steering controller 122 can send control signals to the feedback motor 110 that approximates and/or simulates a steering weight and effects of the environment on the steering mechanism. For example, ruts in the road and/or wind may turn the vehicle off of its intended path, resulting in the steering wheels of the vehicle being turned. In a mechanically-connected steering system, such turns to the steering wheels of the vehicle would be transmitted to the steering wheel. The feedback motor 110 can simulate this turning of the steering wheel 104 to alert the operator to road changes that may affect steering inputs. A feedback motor 112 for the throttle pedal 106 in the feedback motor 114 for the brake pedal 108 can also provide various feedback. For example, feedback motor 112 can receive signals from the speed controller 124 to provide varying degrees of resistance to movement of the throttle pedal 106 based on position of the throttle pedal 106. For example, the feedback motor 112 can provide more resistance the further the throttle pedal 106 is depressed. As another example, in instances where the vehicle 100 may retard the throttle for traction control purposes, the speed controller 124 can actuate the feedback motor 112 to move the throttle pedal 106 to a position corresponding to the retarded position of the throttle pedal 106. Similarly, the feedback motor 114 can receive signals from the speed controller 124 to provide varying degrees of resistance to movement of the brake pedal 108 based on position of the brake pedal 108. For example, the feedback motor 114 can provide more resistance the further the brake pedal 108 is depressed. As another example, in instances with the vehicle 100 may pulse the brakes (e.g., an antilock brake system), the speed controller 124 can command the feedback motor 114 to move the brake pedal 108 in a manner commensurate with such pulsing.

In various embodiments, the control inputs 102 can be located on or within the vehicle. For example, the vehicle 100 can include a passenger compartment with a driver's seat, wherein the steering wheel 104, throttle pedal 106, and brake pedal 108 can be arranged in a typical fashion for a car. In various other embodiments, the control inputs 102 can be located remotely from the vehicle 100. For example, the vehicle may be a drone vehicle that an operator can operate remotely.

The vehicle 100 can also include a vehicle automation module 140. The vehicle automation module 140 can include a processor 142 and a memory 144. The vehicle automation module 140 can also include a vehicle dynamics module 146 and an environmental threat module 148. As described in more detail below, the vehicle dynamics module 146 can monitor the current speed, rates of rotation, and control inputs of the vehicle 100 to determine how close the vehicle is to the limits of control. The environmental threat module 148 can receive various inputs related to the surroundings of the vehicle 100 and determine threats to safe operation of the vehicle 100. The processor 142 can receive the determinations from the vehicle dynamics module 146 and the environmental threat module 148 to determine whether control inputs being made by an operator to the steering wheel 104, the throttle pedal 106, and the brake pedal 108 result in safe operation of the vehicle. Upon determining that the operator's control inputs do not result in safe operation of the vehicle 100, then the processor 142 can send commands to the steering controller 122 and/or the speed controller 124 that override the operators control inputs. This steering controller 122 and the speed controller 124 can send to the vehicle actuators 130, the override commands from the processor 142, in place of commands resulting from operator inputs to the vehicle controls (e.g., the steering wheel 104, the throttle pedal 106, and the brake pedal 108), resulting in safe operation of the vehicle.

The vehicle dynamics module 146 can receive inputs from the steering wheel 104 (e.g., a rotational position of the steering wheel 104), the throttle pedal 106 (e.g., a position of the throttle pedal 106), and the brake pedal 108 (e.g., a position of the brake pedal 108). The vehicle dynamics module 146 can also receive vehicle speed information from one or more vehicle speed sensors 150 (e.g., the vehicles speedometer and/or a GPS receiver). Additionally, the vehicle can receive information about the vehicle acceleration from one or more acceleration sensors. For example, a first acceleration sensor can provide a straight-line acceleration and/or deceleration of the vehicle (i.e., how hard he asked vehicle is accelerating or braking). A second sensor can provide a lateral acceleration of the vehicle (i.e., how hard the vehicle is turning). A third sensor can provide a yaw acceleration of the vehicle (i.e., detecting whether the vehicle is skidding). The vehicle dynamics module 146 can analyze the various received data to determine whether the received inputs to the steering wheel 104, throttle pedal 106, and brake pedal 108 are likely to result in loss of vehicle control. For example, if an operator attempts to turn the steering wheel 104 too much at too high a high speed, then the vehicle may skid. The vehicle dynamics module 146 can provide to the processor 142, a range of control inputs to the steering wheel 104, the throttle pedal 106, and the brake pedal 108 that likely will not result in loss of vehicle control.

The environmental threat module 148 can receive inputs from various systems and/or sensors on board the vehicle to identify nearby threats to safe operation of the vehicle 100. For example, various embodiments of the environmental threat module 148 can receive position information from a location detection sensor and/or system 154 (e.g., a GPS receiver, an inertial guidance system, and/or a dead reckoning system). Various embodiments of the environmental threat module 148 can also receive inputs from one or more vision sensors 156 (e.g., visible light and/or infrared cameras) that provide views of the world surrounding the vehicle. Various embodiments of the environmental threat module 148 can also receive information from one or more radar systems on the vehicle 100 that can detect obstructions in front of, behind, and/or to the sides of the vehicle 100. Various embodiments of the environmental threat module 148 can also receive information from a wireless communication module 160 (e.g. Wi-Fi and/or Bluetooth communications) that can communicate with other vehicles on the road, for example. The environmental threat module 148 can analyze the various received data and/or information to identify travel path (e.g., edges of a road and/or lane and boundaries of intersections), objects (e.g., cars, pedestrians, debris), and/or barriers (e.g., K rails, traffic cones, etc.) that may intrude on the vehicle's path of travel. The environmental threat module 148 can provide to the processor 142, a range of control inputs to the steering wheel 104, the throttle pedal 106, and the brake pedal 108 that will likely avoid the identified objects and/or barriers and/or maintain the vehicle 100 on the identified travel path.

As discussed above, the vehicle automation module 140 can also include a memory unit 144 in communication with the processor 142. In various embodiments, the vehicle dynamics module 146 and/or the environmental threat module 148 can also be in communication with the memory unit 144. The memory unit 144 can store one or more programs used by the processor 142, the vehicle dynamics module 146, and/or the environmental threat module 148. The memory unit 144 can also store a map of roads and/or travel routes for the vehicle, for example. The memory unit 144 can also store operator profiles. In various embodiments, the operator profiles can include an operator skill level. The skill level can be used by the processor 142 and/or the vehicle dynamics module 146 to determine a safe range of control inputs to the steering wheel 104, the throttle pedal 106, and the brake pedal 108 for the skill level. For example, the range of control inputs determined to be safe for a new driver with little experience (e.g., a 16-year-old who just received his driver's license) will be smaller than the range of control inputs determined to be safe for an experienced driver (e.g., a 40-year-old with 24 years of driving experience). As an example, a 16-year-old driver may not be capable of handling any vehicle skids. As a result, the safe range of control inputs for the 16-year-old can be within a range that will not cause any skid. By contrast, a 40-year-old driver may be capable of correcting and/or recovering from a minor skid. As a result, the safe range of control inputs for the 40-year-old can be within a larger range than the 16-year-old, wherein the larger range of control inputs may allow the vehicle to skid at the outer limits of the range.

The processor 142 can determine a skill level of the operator in many different ways. For example, a vehicle 100 may be provided with multiple different keys, wherein each key corresponds to a predetermined skill level. For example, each key can include a microchip, RFID tag, etc. that can communicate with the processor 142 or another control module of the vehicle. The processor 142 and/or the vehicle control module can identify the particular key based on the communications with the microchip, RFID tag, etc. For example, a 16-year-old new driver may be provided with a first vehicle key that corresponds to a small safe range of control inputs. A 40-year-old experienced driver may be provided with a second vehicle key that corresponds to a larger safe range of control inputs. As another example, the vehicle 100 may recognize different drivers and use machine learning techniques to determine a skill level for each recognized driver. For example, the vehicle 100 may include a camera in the vehicle cockpit that can capture an image of the operator's face such that the processor 142 can use facial recognition software to recognize the driver. The processor 142 can assign a base line skill level to a newly recognized driver. The processor 142 can then monitor control inputs to the steering wheel 104, the throttle pedal 106, and the brake pedal 108 by the driver at the limits of the safe range of control inputs associated with the base line skill level. If the newly recognized driver provides correct control inputs at the limits of the safe range, then the processor 142 can incrementally increase the skill level for the newly recognized driver, thereby increasing the safe range of control inputs for the driver. For example, the safe range of control inputs associated with the baseline skill level may allow for the vehicle 100 to enter a small skid at the limits of the range. If the driver provides correct control inputs to correct the small skid (e.g. steers into the skid), then the processor 142 can incrementally increase the driver's skill level and thereby provide an incrementally larger range of control inputs.

Figure 2A:
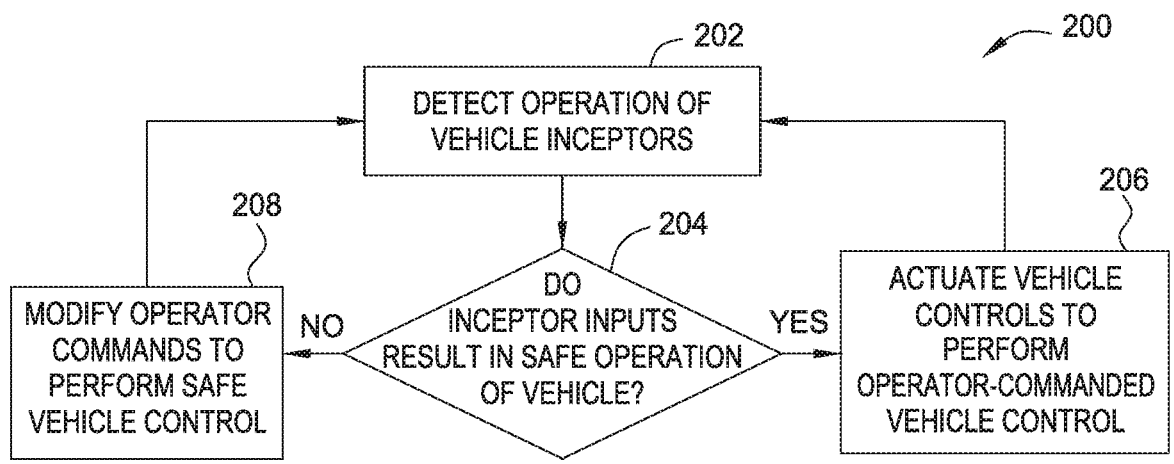
FIG. 2A is a flowchart of an embodiment of a manual operation method for controlling a vehicle.
Figure 2B:
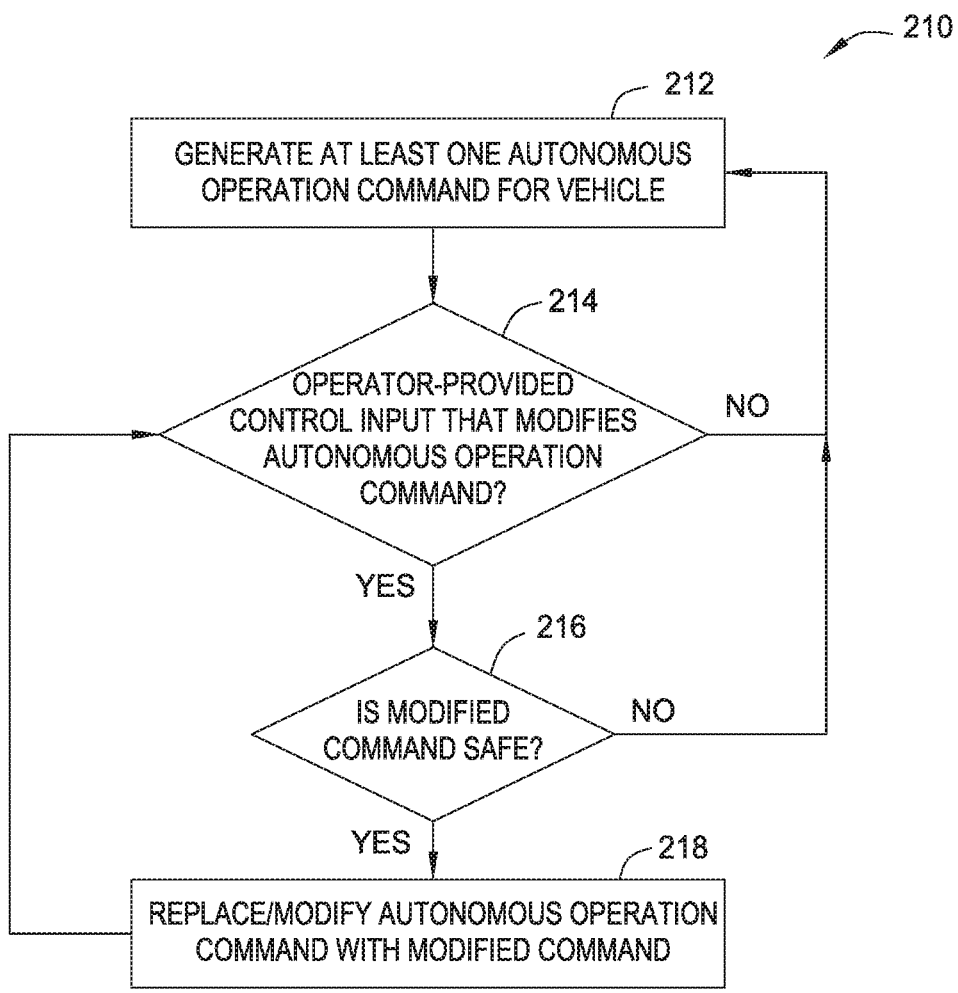
FIG. 2B is a flowchart of an embodiment of an autonomous operation method for controlling a vehicle.

Referring now to FIGS. 2A and 2B, embodiments of a vehicle (e.g., vehicle 100) can operate in a primarily operator-controlled mode or primarily in an autonomous mode. FIG. 2A illustrates a method 200 for a primarily operator-controlled mode. In block 202, the method includes detecting operation of vehicle inceptors by the operator. For example, the processor 142 can detect operation of the steering wheel 104, the throttle pedal 106, and the brake pedal 108 by a vehicle operator (via the vehicle dynamics module 146). In block 204, the method 200 includes determining whether the inceptor inputs results in safe operation of the vehicle. As described above, the processor 142 can determine whether current inceptor inputs fall within a safe range of control inputs provided by the vehicle dynamics module 146 and/or the environmental threat module 148. If the inceptor inputs result in safe operation, then, in block 206, the method 200 includes actuating vehicle controls to perform the operator commanded vehicle control communicated through the inceptor inputs. Returning to block 204, if the inceptor inputs do not result in safe operation, then, in block 208, the method 200 includes modifying the operator commands to perform safe vehicle control. After block 206 or block 208, the method 200 returns to block 202.

FIG. 2B illustrates a method 210 for a primarily autonomous operation mode. In block 212, the method 210 includes generating at least one autonomous operation command for the vehicle. For example, the vehicle may be autonomously following a predetermined route to a destination, and the processor 142 may be issuing commands to the steering controller 122 and/or the speed controller 124 to follow the routes, obey traffic signs and lights, and/or avoid other vehicles and/or pedestrians. In block 214, the method includes determining whether a vehicle operator has provided a control input that modifies autonomous operation commands. For example, the vehicle operator may turn the steering wheel 104, depress the throttle pedal 106, and/or depress the brake pedal 108 in a manner that results in commands being sent to the steering controller 122 and/or the speed controller 124 that differ from autonomous commands being sent by the processor 142. If an operator provided control input does not modify the autonomous operation command, then the method 210 returns to block 212. However, if an operator provided control input does it modify the autonomous operation command, then the method 210 moves to block 216. At block 216, the method 210 includes determining whether the modified command that results from the operator provided control inputs is safe (as discussed above). If the modified command is not safe, then the method 210 returns to block 212. If the modified command is safe, then the method 210 includes replacing the autonomous operation command with the modified command at block 218. After block 218, the method 210 returns to block 214 to again monitor whether the operator is providing a control input that modifies autonomous operation command.

Figure 3:
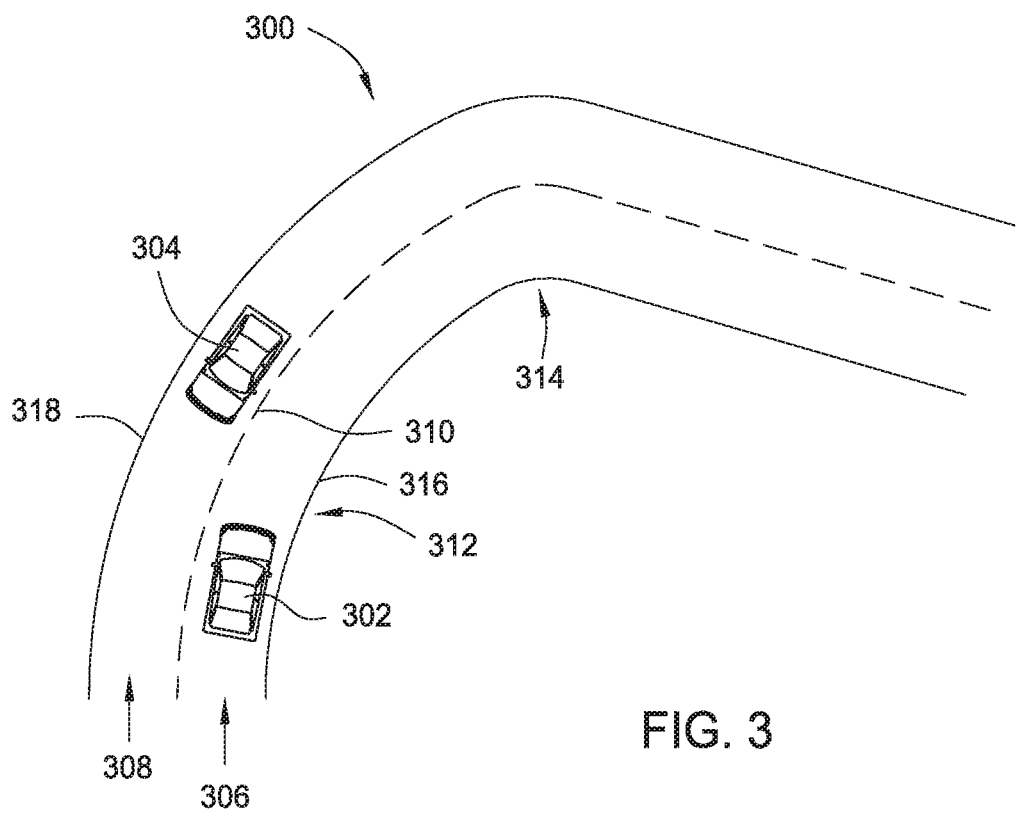
FIG. 3 illustrates an exemplary scenario that illustrates operation of the vehicle of FIG. 1.

FIGS. 3, 4, and 5A-5B describe exemplary scenarios that illustrate operation of a vehicle according to various embodiments. FIG. 3 illustrates this scenario in which a subject vehicle 302 is driving along a road 300 in a lane 306 around a gentle right-hand bend 312. Another vehicle 304 is driving in the opposite direction in a second lane 308. In this scenario, a map stored in the memory 144 can include the road 300 along with the gentle curve 312 and a sharper curve 314 head. Vision sensors 156 in the subject vehicle 302 (e.g. cameras) may detect the center lane line 310 and edge lines 316 and 318. The vision sensors 156 may also detect the oncoming vehicle 304 and the nearby gentle curve 312 of the road. The vision sensors 156 may not be able to see the sharper curve 314 in the road 300 ahead. The environmental threat module 148 can incorporate the mapped data and the data from the vision sensors 156 to determine inputs to the steering wheel 104, the throttle pedal 106, and the brake pedal 108 of the subject vehicle 302 that maintain the subject vehicle 302 in its lane 306. For example, in the gentle bend section 312 of the road 300, the steering wheel 104 may need to be turned clockwise by a small degree to stay between the center lane line 310 and the edge line 316. As the subject vehicle 302 approaches the sharper bend 314 in the road 300, the brake pedal 108 may need to be depressed to slow the vehicle and the steering wheel 104 may need to be turned further to the right to stay in the lane 306. In an autonomous mode of operation, the above described inputs to the steering wheel 104 and the brake pedal 108 can be performed automatically by the processor 142. The processor 142 and the steering controller 122 can send command signals to the feedback motor 110 of the steering wheel 104 to indicate to the vehicle operator the steering inputs being sent to the steering actuator 136 by the processor. Similarly, the processor 142 and the speed controller 124 can send command signals to the feedback motors 112 and 114 of the throttle pedal 106 and brake pedal 108, respectively, to communicate to the vehicle operator the inputs being sent to the brake actuator 132 and throttle actuator 134 by the processor. In such autonomous mode, the vehicle operator may turn the steering wheel 104 clockwise as the subject vehicle 302 approaches the oncoming vehicle 304 to shift the subject vehicle 302 toward the right edge line 316 of the road 300 (to provide additional spacing from the oncoming vehicle 304), for example. Referring to FIG. 2B, in block 212, the processor 142 is providing the autonomous commands to the steering controller 122 and the speed controller 124 to steer the vehicle (via the steering actuator 136) and control the speed of the vehicle (via the brake actuator 132 and the throttle actuator 134). In block 214, the processor 142 can determine that the operator has provided control inputs that modify the autonomous operation commands. In this example, the operator has turned the steering wheel 104 further to a clockwise direction than the autonomous command would turn the steering wheel 104. In block 216, the processor 142 can determine whether the operator provided control input is safe. In this instance, if there is space between the subject vehicle 302 and the edge line 316 of the road 300, then the environmental threat module 148 may indicate that an additional amount of clockwise turning of the steering wheel 104 is safe. As a result, in block 218, the processor 142 can replace the autonomous operation command with the modified command consistent with the control inputs by the operator. If the vehicle subsequently drives onto the edge line 316, then the environmental threat module 148 may indicate that the current amount of clockwise turning of the steering wheel 104 is not safe and indicate to the processor 142 a smaller amount of clockwise turning that is safe (i.e., an amount that will keep the vehicle from crossing the edge line 316). As a result, the processor 142 can stop substituting the modified command for the autonomous operation command.

Still referring to FIG. 3, in a manual operation mode, the operator of the subject vehicle 302 can be steering the vehicle 302 along the gentle curve 312 in the road 300 by providing control inputs to the steering wheel 104. Referring to FIG. 2A, in block 202, the processor 142 can monitor the control inputs to the steering wheel 104. In block 204, the processor 142 can determine whether the control inputs to the steering wheel 104 are safe. For example, the environmental threat module 148 can determine a safe range of steering inputs that maintains the vehicle 302 in the lane 306 between the center lane line 310 and the edge line 316. A first limit of the safe range can be a minimum amount of steering actuation by the steering actuator 136 that prevents the vehicle 302 from crossing over the center lane line 310. A second limit of the safe range can be a maximum amount of steering actuation by the steering actuator 136 that prevents the vehicle 302 from crossing over the edge line 316. The processor 142 can monitor control inputs from the steering wheel 104 to the steering controller 122 that result in the steering actuator providing steering actuations that fall within the safe range determined by the environmental threat module 148. If the control inputs to the steering wheel 104 do not result in a the steering actuator 136 providing steering actuations within the safe range, then in block 208, the processor 142 can modify and/or replace the operator's control inputs to the steering controller 122 (via the steering wheel 104) with control inputs that result in the steering actuator 136 providing steering actuations within the determined safe range. The processor 142 can also send command signals to the feedback motor 110 of the steering wheel 104 to provide an indication to the operator of the modified and/or replaced control inputs. If the control inputs to the steering wheel 104 do result in a the steering actuator providing steering actuations in the safe range, then in block 206, the processor allows the operator's control inputs via the steering wheel to be passed from the steering controller 122 to the steering actuator 136.

Figure 4:
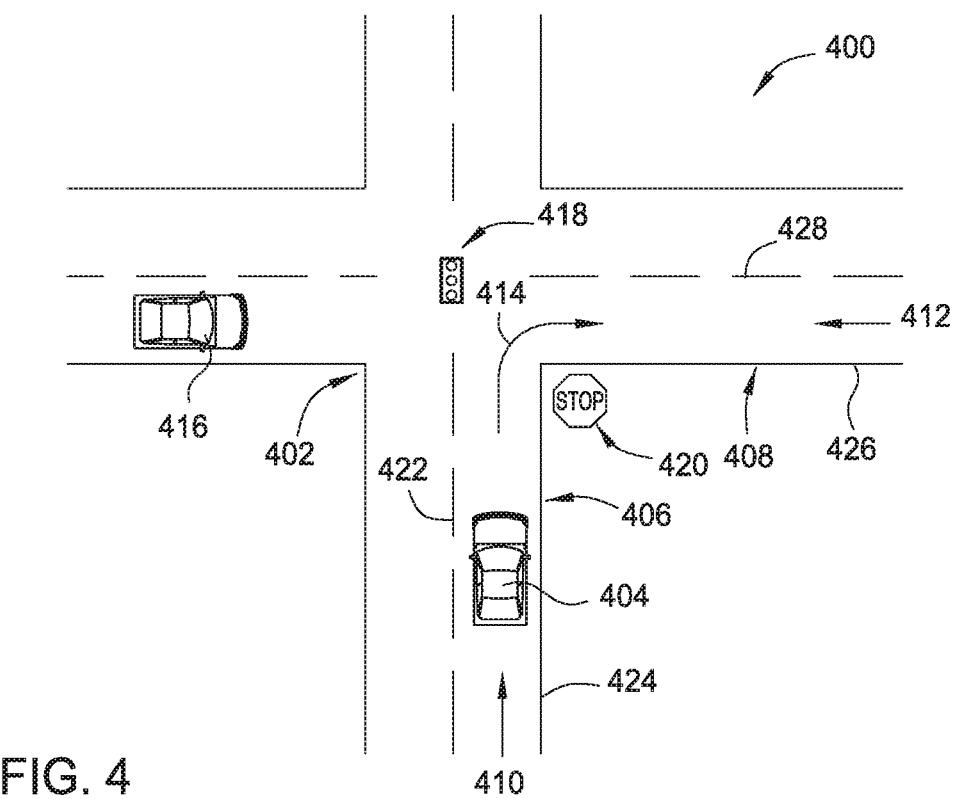
FIG. 4 is another exemplary scenario that illustrates operation of the vehicle of FIG. 1.

FIG. 4 illustrates a scenario in which a subject vehicle 404 is driving on a road 406 toward an intersection 402 of a road network 400, and another vehicle 416 is driving toward the intersection 402 on a perpendicular road 408. In this scenario, a map stored in the memory unit 144 can include the road network 400 as well as the intersection 402. The memory unit 144 may also store a current vehicle route that includes a right hand turn 414 at the intersection 402. Vision sensors 156 in the subject car 404 may detect the center lane line 422 and the edge line 424 of the road 406. The vision sensors 156 may also detect the upcoming intersection 402, as well as any traffic regulating indicators (e.g., a stop sign 420 and/or a traffic signal 418). The vision sensors 156 may also detect the perpendicular street 408, as well as the corner 430, around which the vehicle must travel to make the right-hand turn 414 into the lane 412 of the perpendicular street 408. Radar 158 on the vehicle may be able to detect pedestrians, other cars, and/or objects in the road that the vision sensors 156 may not be able to detect. In the positions shown in FIG. 4, the vision sensors 156 of the subject vehicle 404 may not be able to see the other vehicle 416. For example, a building, tree, or other objects may block the line of sight between the subject vehicle 404 and the other vehicle 416. Referring again to FIG. 1, in various embodiments, the subject vehicle 404 and the other vehicle 416 may be equipped with a wireless communication module 160. In such embodiments, the subject vehicle 404 and the other vehicle 416 may communicate wirelessly about their current positions, intended routes of travel, etc. The environmental threat module 148 can incorporate the map data and the data from the vision sensors 156, and/or the wireless communication module 160 to determine inputs to the steering wheel 104, the throttle pedal 106, and/or the brake pedal 108 of the subject vehicle 404 to safely steer the vehicle from the lane 410 of the first road 406 into the lane 412 of the perpendicular road 408.

Referring again to FIG. 2B, in an autonomous mode of operation, as the subject vehicle 404 approaches the intersection 402, the environmental threat module 148 can determine a safe distance from the intersection 402 at which to begin slowing the vehicle. The environmental threat module 148 can provide the braking information to the processor 142, which can in turn send control signals to the speed controller 124 that actuate the brake actuator to slow the vehicle in block 212. The processor 142 and speed controller 124 can send command signals to the feedback motor 114 of the brake pedal 108 to provide an indication of the actuation of the brake actuator 132 to the operator. If the intersection 402 is controlled by a stop sign 420, then the processor 142 can send signals to bring the vehicle to a complete stop. Similarly, if the intersection 402 is controlled by a traffic signal 418, and the traffic signal is red, then the processor 142 can bring the vehicle to a complete stop. As the subject vehicle 404 drives along the road 406, in block 214, the processor can monitor for operator-provided control inputs. For example, the operator may actuate the brake pedal 108 more aggressively than the processor 142 (e.g., to stop short of the intersection). In block 216, the processor 142 can check to determine whether the operation of the brake pedal 108 is within a safe range of operation. For example, the environmental threat module 148 can determine a minimum actuation (a minimum value of the safe range of operation) of the brake actuator 132 that results in the vehicle stopping before entering the intersection. The environmental threat module 148 can also determine a maximum actuation (a first maximum value of the safe range of operation) of the brake actuator 132 (e.g., to avoid a sudden stop if a vehicle is closely following the subject vehicle 404). The vehicle dynamics module 146 can also determine a maximum actuation (a second maximum value of the safe range of operation) of the brake actuator 132. For example, the vehicle dynamics module can calculate a maximum actuation of the brake actuator 132 before the wheels lock and the tires skid on the road. In various instances, values for range limits calculated by the environmental threat module 148 and the vehicle dynamics module 146 may differ. In the example above, the environmental threat module may set a very high maximum brake actuation of the brake actuator 132 if no other vehicles are detected behind the subject vehicle 404. However, the vehicle dynamics module 146 may set a much lower maximum brake actuation of the brake actuator 132 to avoid a skid. In such instances, the processor 142 can select the more conservative limit on the safe range of operation (e.g., select the maximum brake actuation from the vehicle dynamics module 146). If the operator's operation of the brake pedal is not within the safe range, then the processor returns to block 212 and continues to command the subject vehicle 404 autonomously. In various embodiments, at block 212, the autonomous commands to the subject vehicle 404 to comply with the operator's control inputs as closely as possible within the determined safe limits. Continuing the example above, if the operator depresses the brake pedal 108 to provide more brake actuation than is being autonomously commanded, but the operator's control inputs would result in a skid, then the autonomous braking command can be modified to increase actuation of the brake actuator 132 to the limits beyond which a skid may occur.

If the operator control inputs result in operator of the brake actuator 132 within the determined safe range, then the processor 142 replaces its autonomous commands with the operator-provided inputs to stop the vehicle short of the intersection. After the operator releases the brake pedal 108, the vehicle can proceed to the intersection 402 (e.g., by autonomously actuating the throttle actuator 134). At the intersection, the environmental threat module 148 can determine a safe range of actuation by the steering actuator 136 that will steer the vehicle around the corner 430 of the intersection 402 and into the land 412 of the perpendicular road 408. The processor 142 can receive the safe range from the environmental threat module 148 and can send commands to the steering controller 122 that cause the steering actuator 136 to actuate within the safe range and steer the vehicle to the right and into lane 412 of the perpendicular road 408. The processor 142 and the steering controller 122 can send command signals to the feedback motor 110 of the steering wheel 104 to provide an indication of the actuation of the steering actuator 136.

As the subject vehicle 404 approaches the intersection 402, the other vehicle 416, which is also approaching the intersection 402, may be detected. The environmental threat module 148 may determine (or assume) that the other vehicle 416 is not going to stop short of the intersection 402. As a result, the environmental threat module 148 can determine actuations to the brake pedal 108 to stop the subject vehicle 404 short of the intersection 402 to avoid a possible collision with the other vehicle 416. Compared to the above example, the environmental threat module may determine a higher maximum actuation of the brake actuator 132 for the determined safe range. The processor 142 can then send command signals to the speed controller 124 that can command actuation of the brake actuator within the determined safe range. After the other vehicle 416 passes through the intersection, the environmental threat module 148 can determine that the other vehicle 416 is no longer a threat. Accordingly, the environmental threat module 148 can send a revised range of safe commands to the processor 142 that includes actuation of the throttle actuator 134 so that the subject vehicle 404 can move through the intersection 402.

In a manual operation mode, the operator of the subject vehicle 404 can be steering the subject vehicle 404 toward the intersection 402. As discussed above with reference to FIG. 3, the processor 142 can monitor operation of the steering controller 122 and the speed controller 124 to ensure that the drivers inputs to the steering wheel 104 are within a safe range of operation (as determined by the environmental threat module 148) to maintain the subject vehicle 404 between the center lane marker 422 and the edge marker 424. Referring again to FIG. 2A, at block 202, as the vehicle approaches the intersection 402, the processor 142 can monitor the operator's operation of the throttle pedal 106 and the brake pedal 108 to make sure that the subject vehicle 404 is slowing down to a safe speed as vehicle 404 approaches the intersection 402. As described above, the environmental threat module 148 can determine a safe range of actuation of the brake actuator 132 to safely stop the subject vehicle 404 short of the intersection 402. At block 204, if the operator's control signals via the brake pedal 108 do not result in an actuation of the brake actuator 132 within the determined safe range, then in block 208, the processor can replace and/or modify the operator's control signals with control signals that result in actuation of the brake actuator 132 within the determined safe range. Similarly, if the operator does not see the other vehicle 416 and therefore does not apply the brake pedal 108 to slow the vehicle, the processor 142 can determine that the operator's control inputs are not within the predetermined safe range of operation of the brake actuator 132 (discussed above) and can send command signals to the speed controller 124 to slow the vehicle by actuating the brake actuator within the safe range.

Figure 5A:
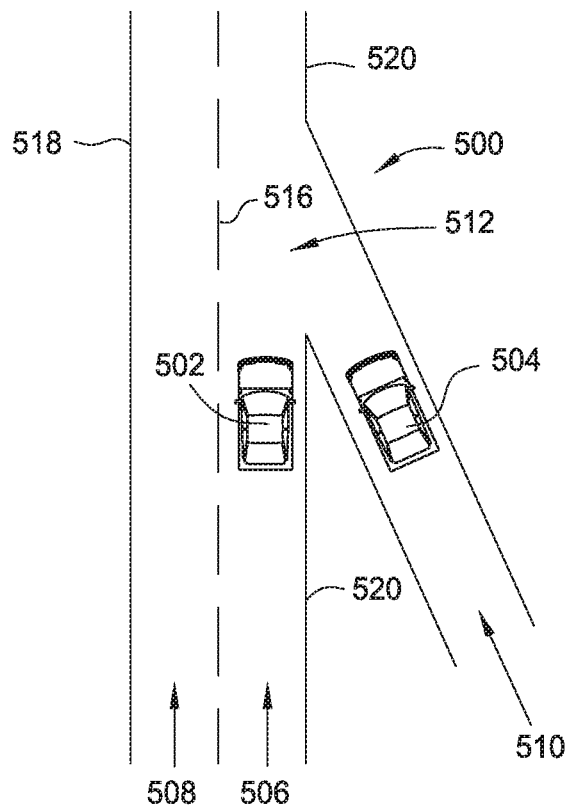
FIGS. 5A and 5B are another exemplary scenario that illustrates operation of the vehicle of FIG. 1.
Figure 5B:
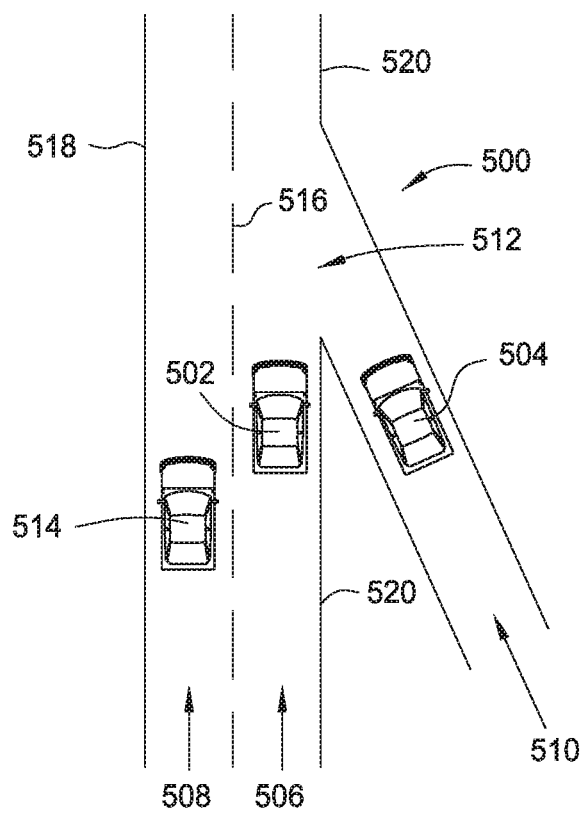

FIGS. 5A and 5B illustrate two variations of a scenario in which a subject vehicle 502 is driving on a limited-access highway 500 in a right-hand lane 506. In FIG. 5A, the subject vehicle 502 is approaching a merge location 512 and another vehicle 504 is driving along an on-ramp lane 510 toward the merge location 512. In this instance, vision sensors 156 of the subject vehicle 502 may detect the center lane line 516 and the edge lines 518 and 520 of the highway 500. The vision sensors 156 may also detect that the adjacent lane 508 is vacant proximate to the subject vehicle 502. The vision sensors 156 may also detect the merge location 512, and the other vehicle 504 driving along the on-ramp 510 toward the merge location 512. As discussed above, the subject vehicle 502 and the other vehicle 504 may be equipped with wireless communication modules 160 that enable the vehicles to ascertain each other's position and intended path of travel. Referring to FIG. 2B, in an autonomous mode, at block 212, the environmental threat module 148 can determine a safe range of operation of the brake actuator 132, throttle actuator 134, and steering actuator 136 for the vehicle. For example, as discussed above, the environmental threat module 148 can determine a safe range of actuations of the steering actuator 136 that maintain the subject vehicle 502 in the lane 506 between the center lane marker 516 and the edge marker 520. The environmental threat module 148 can also determine a safe range of actuations of the throttle actuator 134 that maintain the subject vehicle 502 within a range of the posted speed limit for the highway 500. At block 212, the processor 142 can send command signals to the steering controller 122 and speed controller within the determined safe ranges.

As the subject vehicle 502 approaches the merge location 512, the environmental threat module 148 can detect the merging vehicle 504 in the on-ramp lane 510. In the event the environmental threat module 148 determines that the subject vehicle 502 and the merging vehicle 504 are on a collision course at the merge location 512, the environmental threat module 148 can determine a new safe range of actuations of the brake actuator 132, throttle actuator 134, and steering actuator 136 that avoid the collision. For example, the environmental threat module 148 can provide a safe range of actuations that result in the subject vehicle 502 moving to the adjacent lane 508, speeding up, and/or slowing down. In various embodiments, when multiple options for safe ranges of actuations exist, the environmental threat module 148 may prioritize the options and/or choose a combination of options. For example, reducing speed may be prioritized over increasing speed if the subject vehicle 502 is traveling at the posted speed limit. Additionally, a combination of changing to the adjacent lane 508 and slowing down may be prioritized higher than only slowing down because the combined action may provide the greatest separation between the subject vehicle 502 and the merging vehicle 504.

Moving to block 214 of the autonomous control mode method 210, the processor can detect whether the vehicle operator attempts to provide a control input (through the steering wheel 104, throttle pedal 106, and/or the brake pedal 108) that differs from commands being sent from the processor 142 to the steering controller 122 and the speed controller 124. For example, in response to detecting the merging vehicle 504, the environmental threat module 148 may determine that a safe range of actuations include actuating the steering actuator 136 to move the vehicle to the adjacent lane 508 and actuations of the throttle actuator 134 or the brake actuator 132 to speed up or slow down, respectively. As an example, assume that the processor actuates the steering actuator 136 within the safe range to change lanes and actuates the brake actuator 132 to slow down in response to the environmental threat module 148 detecting the merging vehicle 504 (block 212). The vehicle operator may attempt to speed up in response to seeing the merging vehicle 504 (by further depressing the throttle pedal 106). At block 214, the processor 142 can determine that the operator's control inputs differ from its autonomous command signals. At block 216, the processor 142 can determine whether the operator's command inputs are safe. As discussed above, in this example, the environmental threat module 148 has included a safe range of actuations of the throttle actuator 134 if the vehicle can safely accelerate. If the operator's control inputs to the throttle pedal 106 result in actuation of the throttle actuator 134 within the determined safe range, then in block 218, the processor 142 can replace and/or modify its autonomous commands with the operator's commands. For example, the processor 142 can replace its autonomous commands by terminating the above-described commands to the steering controller 122 and the speed controller 124 to change lanes and slow down, respectively. Instead, the processor 142 can allow the operator's control inputs to the throttle pedal 106 to be communicated to the speed controller 124 and the throttle actuator 134. As another example, the processor 142 can modify its autonomous commands by only ceasing its autonomous commands to the speed controller 124 to slow down. As a result, the processor 142 will autonomously command the steering controller 122 so that the subject vehicle 502 changes lanes and the operator controls the speed controller 124 so that the subject vehicle 502 increases speed.

Referring now to FIG. 5B, a third vehicle 514 may be in the adjacent lane 508, thereby preventing the subject vehicle 502 from changing lanes. As a result, the environmental threat module 148 would eliminate from the safe ranges of actuation any actuation of the steering actuator 136 that causes the subject vehicle 502 to change lanes. Instead, the environmental threat module 148 may determine safe ranges of actuation of the brake actuator 132 or the throttle actuator 134 to slow down or speed up, respectively, to avoid a collision with the merging vehicle 504. The processor 142, in turn, can send command signals to the speed controller 124 to reduce or increase vehicle speed to avoid a collision with the other vehicle 504 on the on-ramp 510, heading toward the merge location 512. Referring again to FIG. 2B, if the vehicle operator tries to turn the steering wheel 104 counterclockwise to move the subject vehicle 502 to the adjacent lane 508 to avoid the merging vehicle 504 (block 214), then, at block 216, the processor 142 can determine that the control input is not in the safe range (because of the third vehicle 514). The processor 142 can send command signals to the feedback motor 110 of the steering wheel 104 to indicate to the operator that the control input is being rejected. After determining that the operator's control inputs are unsafe, the processor 142 can continue to issue its autonomous command to the speed controller 124 to slow down (block 212).

Referring again to FIGS. 2A and 5A, in a manual mode of operation, the processor 142 can monitor an operator's operation of the control inputs 102 of the subject vehicle 502 (block 202). For example, as discussed above, the processor 142 can monitor operation of the vehicle to ensure that it stays within the lane 506. In the event the driver fails to correct for the subject vehicle 502 drifting out of the lane 506 (block 204), the processor 142 can send command signals to the steering controller 122 that correct such drift (block 208). As the subject vehicle 502 approaches the merge location 512, as discussed above, the environmental threat module 148 can detect the merging vehicle 504 and the impending collision. Also, as discussed above, the environmental threat module 148 can send to the processor 142 a safe range of actuations of the brake actuator 132, throttle actuator 134, and/or steering actuator 136 that would avoid the collision. The processor 142 can monitor operation of the steering wheel 104, the throttle pedal 106, and the brake pedal 108 (block 202) to determine whether the operator provides control signals that result in actuation of the actuators within the determined safe range of actuations (block 204). For example, if the operator of the subject vehicle 502 moves the subject vehicle 502 into the adjacent lane 508, then the processor 142 may take no action (block 206). Similarly, if the vehicle operator slows down or speeds up, then the processor 142 may take no action (block 206). However, if the operator takes no action to avoid the conflict with the other vehicle 504 or takes an action that does not resolve the conflict, then the processor 142 can send command signals consistent with the environmental threat module 148 to move the vehicle to the adjacent lane 508, slow down, and/or speed up to avoid the collision. Referring again to FIG. 5B, in manual mode, if the operator of the subject vehicle 502 attempts to turn the steering wheel 104 counterclockwise to move to the adjacent lane 508 and avoid a collision with the other vehicle 504 (e.g., the vehicle operator is not aware of the third vehicle 514), then the processor 142 can override the operator's command signals to the steering controller to maintain the subject vehicle 502 in the original lane 506. The processor 142 can send command signals to the feedback motor 110 of the steering wheel 104 (via the steering controller) to indicate to the operator that the lane change is not being allowed.

In various embodiments, a display screen can provide textual and/or graphical information about operation of the vehicle automation module 140 to the operator. For example, the display screen can provide an image of the environment surrounding a vehicle and highlight objects in the environment that the environmental threat module 148 has identified. The display screen can also provide information about instances when the vehicle automation module 140 overrides the operator. For example, a text-based message can be provided to explain why an operator-provided control input is not implemented. As another example, a graphical message (e.g., an image of an object the car may collide with under the operator's control inputs) can be provided as an explanation.

The descriptions of various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The various embodiments described herein may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to various embodiments, other and further embodiments may be devised without departing from the basic scope thereof, and the scope thereof is determined by the claims that follow.

What is claimed is:

1. A computer-implemented method for controlling a vehicle using one or more actuators, the method comprising:
    applying, using a computer processor, an autonomous operation command to the one or more actuators to thereby direct the vehicle during motive operation;
    during the application of the autonomous operation command:
        receiving a control input from at least one inceptor for the vehicle; and
        determining a modified command that would result when the control input is applied in conjunction with the autonomous operation command to the one or more actuators;
    determining a safe range of operation for the at least one inceptor;
    applying the modified command to the one or more actuators responsive to determining that the control input is within the safe range of operation; and
    ceasing application of the modified command responsive to determining that the control input is no longer within the safe range of operation.

2. The computer-implemented method of claim 1, wherein applying the autonomous operation command occurs while the vehicle is in an autonomous operation mode.

3. The computer-implemented method of claim 1, wherein the control input comprises at least one of a steering input, an acceleration input, and a braking input.

4. The computer-implemented method of claim 1, further comprising:
    responsive to preventing a modification of the autonomous operation command, providing feedback to the at least one inceptor that provides an indication of preventing the modification.

5. The computer-implemented method of claim 1, the method further comprising:
    receiving environmental information describing one or more aspects of an environment surrounding the vehicle; and
    determining the safe range of operation for the at least one inceptor based on the environmental information.

6. The computer-implemented method of claim 1, the method further comprising:
    determining a skill level of an operator of the vehicle; and
    determining the safe range of operation for the at least one inceptor based on the skill level of the operator.

7. The computer-implemented method of claim 6, wherein determining the skill level of the operator comprises:
    identifying whether the operator corresponds to a predefined operator profile having a skill level; and
    determining whether the operator operates the inceptor within a limit of the safe range of operation, wherein determining the safe range of operation for the at least one inceptor comprises incrementally increasing the safe range of operation.

8. A controller for a vehicle, comprising:
    one or more computer processors configured to:
        apply an autonomous operation command to one or more actuators of the vehicle to thereby direct the vehicle during motive operation;
        during the application of the autonomous operation command:
            receive a control input from at least one inceptor for the vehicle; and
            determine a modified command that would result when the control input is applied in conjunction with the autonomous operation command to the one or more actuators;
        determine a safe range of operation for the at least one inceptor;
        apply the modified command to the one or more actuators responsive to determining that the control input is within the safe range of operation; and
        cease application of the modified command responsive to determining that the control input is no longer within the safe range of operation.

9. The controller of claim 8, wherein applying the autonomous operation command occurs while the vehicle is in an autonomous operation mode.

10. The controller of claim 8, wherein the control input comprises at least one of a steering input, an acceleration input, and a braking input.

11. The controller of claim 8, wherein the one or more computer processors are further configured to:
    responsive to preventing a modification of the autonomous operation command, provide feedback to the at least one inceptor that provides an indication of preventing the modification.

12. The controller of claim 8, wherein the one or more computer processors are further configured to:

receive environmental information describing one or more aspects of an environment surrounding the vehicle; and determine the safe range of operation for the at least one inceptor based on the environmental information.

13. The controller of claim 8, wherein the one or more computer processors are further configured to:

determining a skill level of an operator of the vehicle; and determining the safe range of operation for the at least one inceptor based on the skill level of the operator.

14. The controller of claim 13, wherein determining the skill level of the operator comprises:

identifying whether the operator corresponds to a predefined operator profile having a skill level; and determining whether the operator operates the inceptor within a limit of the safe range of operation, wherein determining the safe range of operation for the at least one inceptor comprises incrementally increasing the safe range of operation.

15. A vehicle comprising:

one or more actuators;

one or more inceptors; and a controller configured to:

apply an autonomous operation command to the one or more actuators to thereby direct the vehicle during motive operation;

during the application of the autonomous operation command:

receive a control input from the one or more inceptors; and determine a modified command that would result when the control input is applied in conjunction with the autonomous operation command to the one or more actuators;

determine a safe range of operation for the one or more inceptors;

apply the modified command to the one or more actuators responsive to determining that the control input is within the safe range of operation; and cease application of the modified command responsive to determining that the control input is no longer within the safe range of operation.

16. The vehicle of claim 15, wherein applying the autonomous operation command occurs while the vehicle is in an autonomous operation mode.

17. The vehicle of claim 15, wherein the control input comprises at least one of a steering input, an acceleration input, and a braking input.

18. The vehicle of claim 15, wherein the controller is further configured to:

responsive to preventing a modification of the autonomous operation command, provide feedback to the one or more inceptors that provides an indication of preventing the modification.

19. The vehicle of claim 15, wherein the controller is further configured to:

receive environmental information describing one or more aspects of an environment surrounding the vehicle; and determine the safe range of operation for the one or more inceptors based on the environmental information.

20. The vehicle of claim 15, wherein the controller is further configured to:

determine a skill level of an operator of the vehicle; and determine the safe range of operation for the one or more inceptors based on the skill level of the operator.

* * * * *